July 15, 1958

W. N. POWELL 2,843,216

AIR FILTER AND HUMIDIFIER

Filed May 13, 1954

INVENTOR.
WILLIAM N. POWELL

BY Townsend, Townsend & Hoppe
ATTORNEYS

United States Patent Office 2,843,216
Patented July 15, 1958

2,843,216

AIR FILTER AND HUMIDIFIER

William N. Powell, Barstow, Calif., assignor of twenty-five percent each to Darrel A. Rush, Urban H. Harter, and George H. Thompson Application May 13, 1954, Serial No. 429,654

5 Claims. (Cl. 183—12)

This invention relates to a new and improved air filter and humidifier for internal combustion engines and comprises a continuation in part of my application Ser. No. 330,788, filed January 12, 1953 for Air Filter and Humidifier.

This invention comprises an improvement in air filters such as are commonly installed at the intake of the carburetor of internal combustion engines in order to remove dust and other undesirable substances from the air stream entering the carburetor, thereby preventing damage to the engine. As customarily constructed, such air filters have a filtering medium, frequently bathed in oil, which traps the dust particles and other undesirable matter drawn therethrough.

Humidification of air drawn into internal combustion engines improves performance by reducing the knock characteristics of the engine, increasing the gasoline mileage, and improves hill-climbing abilities. Accordingly, the present invention employs water which is sprayed over the filtering medium of the air filter, thereby moistening the filter and assisting in trapping dust and other undesirable substances and at the same time greatly increasing the surface area of the water so that it is more readily drawn into the air intake as water vapor. Humidification is thus accomplished without the danger which arises if drops of water are injected, such as is sometimes accomplished by water sprayed directly into the intake manifold.

The present invention is characterized by the employment of the two filters through which the air passes successively. The first filter in the path of the air is formed of glass wool or similar non-absorbent filaments upon which the water is sprayed. None of the water is absorbed by the filaments but the particles of water are broken up into a very large surface area to facilitate evaporation into the air stream. Beyond the first filter is a second filter of an absorbent material such as excelsior which absorbs excess moisture and insures a uniformity in the humidity of the air entering the carburetor. Each of the filters is contained in a wire cloth covering which facilitates installation and removal of the filters and prevents particles thereof from breaking off and entering into the air stream.

Excess water sprayed onto the first filter runs down to the bottom of the casing, the bottom being shaped so that the excess water may be drawn off and recirculated by a pump.

Other objects of the present invention will become apparent upon reading the following specification and referring to the accompanying drawings in which similar characters of reference represent corresponding parts in each of the several views.

Figure 1:
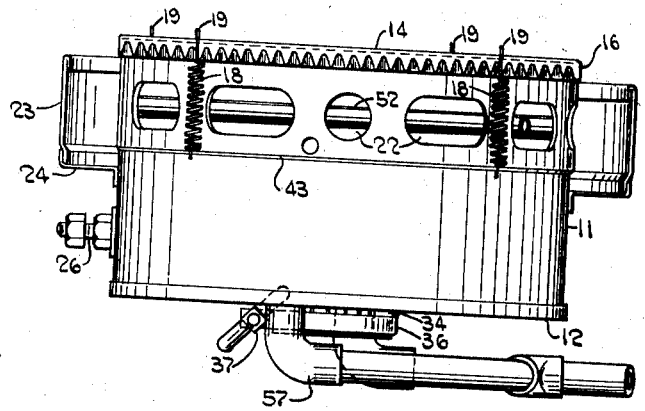
Fig. 1 is a side elevation of the device.
Figure 2:
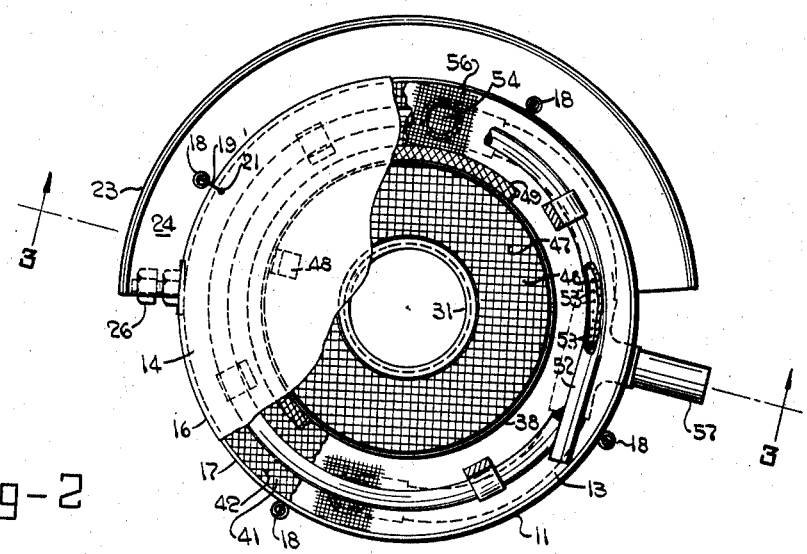
Fig. 2 is a top plan partially broken away in section.
Figure 3:
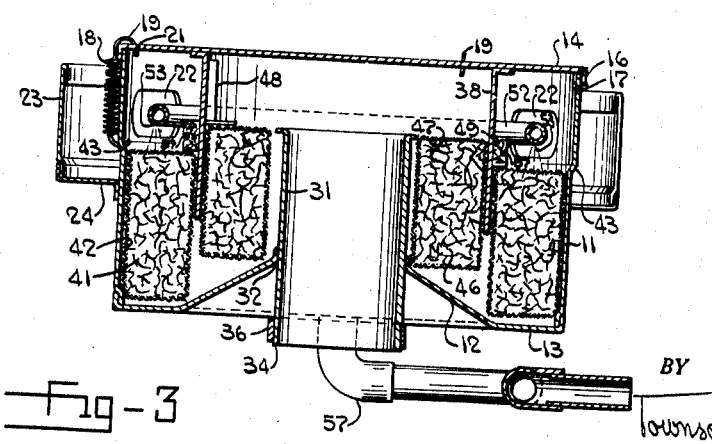
Fig. 3 is a vertical section taken substantially along the line 3—3 of Fig. 2.

The present invention is intended for installation at the customary location of a conventional air filter, above the carburetor and beneath the hood of the vehicle. Where space does not permit such installation, modification of the present invention may be performed by drawing the air off at the top rather than the bottom of the filter.

The filter is installed in a cylindrical sheet metal casing 11 having a conical, upwardly convex bottom 12 with a flat, annular outer rim 13 and a flat circular cover 14 having a short depending skirt 16 which is crimped to fit around the upper, reinforced edge 17 of the cylindrical casing. The cover 14 is further secured to casing 11 by means of helical springs 18 anchored to the casing at their lower end and having hooks 19 on their upper ends which fit into holes 21 in the cover. The tension of the springs 18 and the crimping of the skirt of the cover prevent rattling and also hold the filter elements in position as hereinafter appears.

The casing 11 is formed with a plurality of vents 22 around its side spaced slightly downwardly from the upper edge. Optionally an air scoop may be installed on the exterior of the casing, the air scoop comprising a semi-circular shield 23 concentric with the casing and disposed rearwardly thereof, the shield extending up from a horizontal semi-annular bottom 24 secured to the casing. The function of the scoop is to direct a greater amount of air through the vents 22. The casing is also provided with one or more studs 26 which may be attached to brackets (not shown) anchored to stationary portions of the vehicle in order to support the casing and prevent excessive movement from vibration of the motor.

Extending upwardly through the bottom of the casing is a concentric pipe 31. A water and air-tight joint is formed at the aperture 32 in the bottom through which the pipe extends. The top of the pipe 31 extends approximately three-fourths the height of the casing. The lower end 34 of the pipe extends downwardly below the bottom and is serrated and arranged to fit over the upper end of the carburetor intake (not shown). A split ring 36 is installed around the outside of the serrated lower edge of the pipe and provided with a screw clamp 37 which may be tightened to form an air-tight seal of the pipe with the carburetor intake.

Depending from the cover approximately two-thirds the depth of the casing is a cylindrical baffle 38 which is located approximately mid-way between the casing 11 and the outside diameter of the pipe 31. Baffle 38 insures that the air entering through the vents 22 is directed downwardly at least below the lower edge of the baffle and then upwardly over the upper edge of the pipe in a circuitous pathway.

Installed in the space between the baffle and the casing in approximately the bottom half of the casing is a first filter 41. The filter material is preferably a relatively non-absorbent substance such as glass wool. Surrounding the filter material is a screen 42 of hardware cloth, the shape of which is annular so that a compact ring containing the filter material may be inserted and removed in the space between the baffle 38 and the outer casing 11 when the cover 14 is removed, casing 11 being formed with a shoulder 43 and enlarged diameter above the level of the top of filter 41 to facilitate retention in position. The glass wool is easily cleaned to remove foreign substances which become entrained therein. Another function of filter 41 is to receive a spray of water, by means hereinafter described, and to break up the spray into fine particles which are more easily vaporized as air is drawn through the filter.

A second filter 46 is installed between pipe 31 and baffle 38 and it likewise is encased in a screen 47 of hardware cloth or wire screening to form a ring similar in shape but smaller in diameter than first filter 41. The inner filter 46 is made up of excelsior and for this purpose aspen wood excelsior has been found particularly advantageous.

In order to locate the two filters 41 and 46 in position, the inner surface of baffle 38 is provided with depending, outwardly extending fingers 48 which engage the upper edge of the screen 47 of inner filter 46 and force it downwardly as cover 14 is pushed downwardly. The outside of baffle 38 is provided with a sponge rubber ring 49 secured thereto as by means of a wire 51 which ring 49 engages the upper edge of screening 42 of outer filter 41 and forces it downward into engagement with the rim 13 of bottom 12.

Above the level of the outer filter 41 and located substantially mid-way between the baffle 38 and the casing 11 at about the level of the vents 22 is a ring 52 of tubing, the bottom of which is formed with a plurality of small holes 53 extending the entire distance around the casing. The tube 52 is connected to a pump (not shown) which is in turn connected to a tank of water so that water may be sprayed through the tube 52 onto the top of filter 41. A plurality of openings 54 are formed in the flat outer portion of the bottom of the casing, these openings being covered by screening 56 and the openings are connected to pipe 57 which leads to the tank (not shown) from which the pump draws the water sprayed through the tubing 52.

The function of the apparatus is to humidify the air drawn into the carburetor. Thus, water is sprayed through the holes 53 in the bottom of tubing 52 over the top of the outer filter 41. The relatively non-absorbent nature of the glass wool which makes up the filter 41 causes the water to run down to the bottom of the casing but the particles of water are very finely broken up by the filter material so as to increase the efficiency of humidification. Any excess water which flows through the outer filter 41 is drawn off through the openings 54 and back to the tank for recirculation. The air drawn through the vents 22 and passing down through the filter 41 is humidified by contact with the fine particles of water in the outer filter. As the air passes under the bottom edge of the baffle 38 it comes in contact with the excelsior 46 in the inner filter and any excess moisture is entrained on the inner filter, thereby preventing the moisture from being drawn into the engine in any form other than a vapor. The slanted bottom 12 of the casing and the fact that the upper edge of the inner filter 46 is considerably elevated above the bottom 12 prevent the air from coming into contact with a large body or layer of water which, in the event of a sudden acceleration of the engine, might be drawn into the carburetor.

Although the foregoing invention has been described by way of illustration and example for purposes of clarity of understanding, it is understood that certain changes and modifications may be practiced within the spirit of the invention and scope of the appended claims.

What is claimed is:

1. An air filtering and humidifying device comprising a cylindrical casing apertured adjacent its upper edge to form air inlet vents, a removable cover mounted on and closing the top of said casing, a bottom for said casing, an air outlet conduit extending up through the bottom of said casing, a cylindrical baffle projecting down from said cover outside said conduit and having its bottom edge positioned substantially above said bottom of said casing, a first filter medium disposed between said baffle and said casing, a second filter medium disposed between said baffle and said conduit, said filter media being discrete, a perforated tube lying inside said casing and outside said baffle above the top of said first filter medium adjacent said air vents, and means for forcing water into said tube to spray water over said first filter medium, said first filter medium being relatively non-absorbent of water and said second filter medium being water absorbent.

2. A device according to claim 1 in which said first filter medium is glass wool and said second filter medium is wood excelsior.

3. A device according to claim 1 in which said bottom is upward convex adjacent its center and flat adjacent its outer edge, said outer edge being formed with drain openings.

4. An air filtering and humidifying device according to claim 1 in which a first and a second screen are provided encasing said first and second filter media, respectively.

5. A device according to claim 4 in which each said screen is formed in a ring rectangular in cross-section and completely filling the width of the space in which it is installed.

References Cited in the file of this patent

UNITED STATES PATENTS

| | | |
|---|---|---|
| 1,037,517 | Paschka | Sept. 3, 1912 |
| 1,205,964 | Balassa | Nov. 28, 1916 |
| 1,375,422 | Sherer | Apr. 19, 1921 |
| 2,310,118 | Reinhart | Feb. 2, 1943 |
| 2,627,934 | Martinek | Feb. 10, 1953 |